and a width between 5 to 30 nm.

(12) United States Patent
Cathala et al.

(10) Patent No.: US 9,260,551 B2
(45) Date of Patent: Feb. 16, 2016

(54) COMPOSITION IN THE FORM OF AN EMULSION, COMPRISING A HYDROPHOBIC PHASE DISPERSED IN AN AQUEOUS PHASE

(75) Inventors: Bernard Cathala, La Chapelle sur Erdre (FR); Isabelle Capron, Nantes (FR); Hervé Bizot, Suce-sur-Erdre (FR); Alain Buleon, La Chapelle sur Erdre (FR); Irina Kalashnikova, Leningradskaya, Obl. (RU)

(73) Assignee: INSTITUT NATIONAL DE LA RECHERCHE AGRONOMIQUE, Paris (FR)

( * ) Notice: Subject to any disclaimer, the term of this patent is extended or adjusted under 35 U.S.C. 154(b) by 0 days.

(21) Appl. No.: 13/810,629

(22) PCT Filed: Jul. 18, 2011

(86) PCT No.: PCT/FR2011/051717
§ 371 (c)(1),
(2), (4) Date: Jan. 16, 2013

(87) PCT Pub. No.: WO2012/017160
PCT Pub. Date: Feb. 9, 2012

(65) Prior Publication Data
US 2013/0122071 A1    May 16, 2013

(30) Foreign Application Priority Data

Jul. 19, 2010  (FR) .................................... 10 55836

(51) Int. Cl.
| | | |
|---|---|---|
| A61K 8/06 | (2006.01) | |
| A61K 9/107 | (2006.01) | |
| C08F 136/06 | (2006.01) | |
| C08F 4/12 | (2006.01) | |
| C08F 4/04 | (2006.01) | |
| B01F 17/00 | (2006.01) | |
| C08F 36/04 | (2006.01) | |
| C08C 19/22 | (2006.01) | |

(52) U.S. Cl.
CPC ........... *C08F 136/06* (2013.01); *B01F 17/0035* (2013.01); *C08C 19/22* (2013.01); *C08F 4/04* (2013.01); *C08F 4/12* (2013.01); *C08F 36/04* (2013.01)

(58) Field of Classification Search
CPC ........ A61K 8/062; A61K 8/027; A61K 8/731
See application file for complete search history.

(56) References Cited

U.S. PATENT DOCUMENTS

| | | | | |
|---|---|---|---|---|
| 6,001,338 | A  * | 12/1999 | Mondet ........................... | 424/61 |
| 6,534,071 | B1 * | 3/2003 | Tournilhac et al. ........... | 424/401 |
| 2009/0304757 | A1* | 12/2009 | Herve et al. ................... | 424/401 |
| 2010/0210501 | A1* | 8/2010 | Caggioni et al. .............. | 510/338 |

FOREIGN PATENT DOCUMENTS

| | | |
|---|---|---|
| EP | 1057477 | 12/2000 |
| JP | 2009-197122 | 9/2009 |
| JP | 2010-116477 | 5/2010 |

OTHER PUBLICATIONS

Beck-Candanedo, "Effect of Reaction Conditions on the Properties and Behavior of Wood Cellulose Nanocrystal Suspensions", Biomacromolecules, 6, 1048-1054, 2005.*
Bondeson, "Optimization of the isolation of nanocrystals from microcrystalline cellulose by acid hydrolysis", Cellulose, 13:171-180, 2006.*
Araki, "Influence of surface charge on viscosity behavior of cellulose microcrystal suspension", The Japan Wood Research Society, 45:258-261, 1999.*
Jonoobi, "Preparation of cellulose nanofibers with hydrophobic surface characteristics", Cellulose, 17:299-307, published online Dec. 5, 2009.*
Kim et al., "Effect of Acetylation on Emulsifying Properties of Glycinin", J. Agric. Food Chem., 38, 669-674, 1990.*
Ashby et al. (2000) "Pickering Emulsions Stabilised by Laponite Clay Particles," *Phys. Chem. Chem. Phys.* 2:5640-5646.
Goussé et al. (2002) "Stable Suspensions of Partially Silylated Cellulose Whiskers Dispersed in Organic Solvents," *Polymer.* 43:2645-2651.
Madivala et al. (Mar. 2009) "Exploiting Particle Shape in Solid Stabilized Emulsions," *Soft Matter.* 5:1717-1727.
Ougiya et al. (1997) "Emulsion-Stabilizing Effect of Bacterial Cellulose," *Bioscience Biotechnology Biochemistry, Japan Society for Bioscience, Biotechnology, and Agrochemistry*, Tokyo, Japan, 61(9):1541-1545.
Eichhorn S.J. et al. (Published online Sep. 2009) "Review: Current International Research Into Cellulose Nanofibres and Nanocomposites," *J. Mater. Sci.* 45:1-33.
International Search Report issued in PCT/FR2011/051717 on Jun. 12, 2011.
International Preliminary Report on Patentability issued in PCT/FR2011/051717 on Jan. 22, 2013 (English translation).
Written Opinion issued in PCT/FR2011/051717 on Jan. 22, 2013 (English translation).

* cited by examiner

*Primary Examiner* — Robert T Crow
*Assistant Examiner* — John P Nguyen
(74) *Attorney, Agent, or Firm* — Lathrop & Gage LLP

(57) ABSTRACT

The present invention relates to a composition in the form of an emulsion, advantageously a Pickering emulsion, comprising a hydrophobic phase dispersed in an aqueous phase, which composition contains emulsifying particles capable of stabilizing said emulsion, at least some of said particles consisting of cellulose nanocrystals having an elongated shape, which have the following features: a length between 25 nm to 1 µm, and a width between 5 to 30 nm.

20 Claims, 1 Drawing Sheet

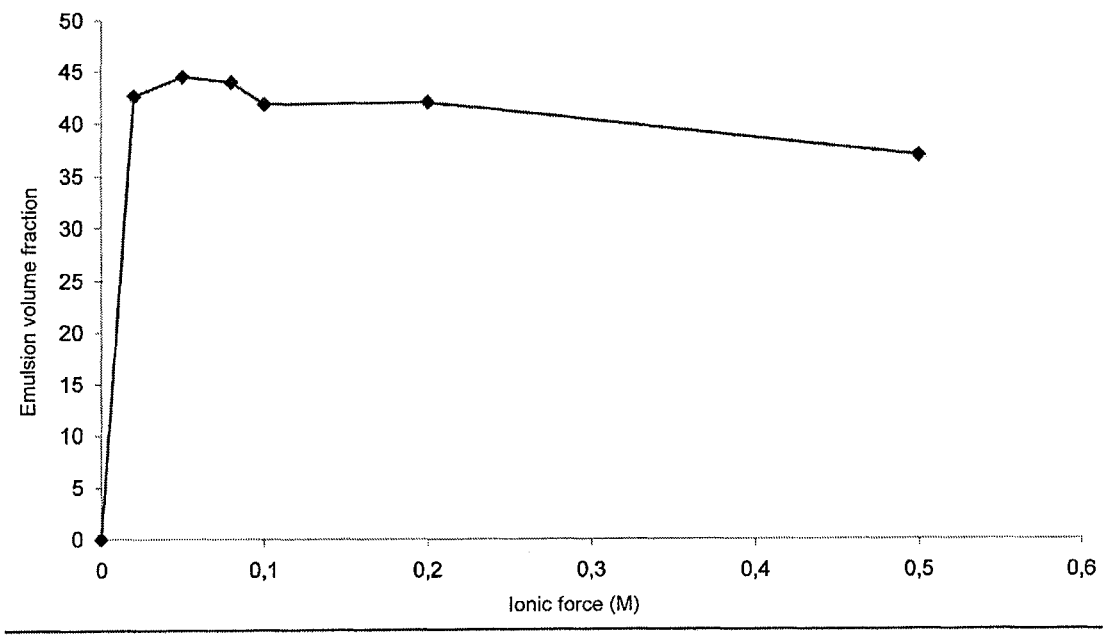

COMPOSITION IN THE FORM OF AN EMULSION, COMPRISING A HYDROPHOBIC PHASE DISPERSED IN AN AQUEOUS PHASE

CROSS-REFERENCE TO RELATED APPLICATIONS

This application is a U.S. National Stage application of international application PCT/FR2011/051717, filed on Jul. 18, 2011, which designates the United States, which was published in French, and which claims the benefit of FR1055836, filed Jul. 19, 2010. Each of these applications is incorporated by reference herein in its entirety.

The present invention relates to a composition in the form of an emulsion, comprising a hydrophobic phase dispersed in an aqueous phase.

STATE OF THE ART

An emulsion is of the "oil-in-water" type, when (i) the dispersing phase is an aqueous phase and (ii) the dispersed phase is an organic phase (a hydrophobic or an oil phase). Such an emulsion is also commonly referred to as the "O/W" initials.

And yet such a physical state lacks stability: an organic phase tends to merge to form one single continuous assembly, especially because of the density difference as compared to the aqueous phase.

To obtain this stability, a first approach does consist in using compounds that are said to be "stabilizers", thus providing to the emulsion rheological properties that are able to slow down the coalescence phenomenon.

To stabilize emulsions, another approach does consist in using compounds that are said to be "emulsifying agents" or "emulsifiers".

These emulsifying agents are most of the time emulsifying surfactants (also called "surface-active agents") which, thanks to their amphiphilic structure, place at the water-oil interface and thus stabilize the organic droplets dispersed therein.

However, the emulsifying agents of this type do not always provide the expected stability over the time. In addition, the synthetic surfactants suffer from being harmful from an ecological point of view.

These emulsifying agents may also consist of solid particles, which enable to obtain the so called "Pickering emulsions".

Pickering emulsions are emulsions that are devoid of surfactants, and which are stabilized by suspended colloidal particles anchoring at the oil-water interface.

As opposed to the surfactants which continuously adsorb and desorb, suspended colloidal particles highly adsorb (and sometimes even irreversibly) at the interfaces.

In practice, such Pickering emulsions have very unusual and interesting properties, especially as compared to traditional emulsions that have been stabilized by surfactants.

In particular, emulsions, with micrometer to centimeter particle sizes, can be very easily prepared, especially by taking advantage of the so called "limited coalescence" phenomenon. In addition, the resulting compositions are much more stable than their homologues that have been stabilized by surfactants.

To be mentioned as a suitable illustration of such a Pickering emulsion, is for example FR-2 794 466 which describes the use of cellulose fibrils in cosmetic compositions of the O/W emulsion type, so as to ensure the stabilization of the latter in the absence of any surfactant.

The cellulose fibrils used are longer than 1 μm and preferably have a length ranging from 5 to 40 μm, for a diameter between 2 and 100 manometers. They have a length to diameter ratio equal to or higher than 30.

In addition, the cellulose fibrils used are in a partially amorphous form: they preferably have a degree of crystallinity equal to or lower than 50%, and preferably ranging from 15 to 50%.

And yet, it turns out that those cellulose fibrils that are longer than 1 μm do not enable to produce calibrated emulsions with a controlled and uniform size, and therefore make it impossible to prepare monodispersed emulsions having an organic droplet reduced size. In fact, with those cellulose fibrils that are longer than 1 μm, the stabilizing effect of an emulsion is gained through the formation of a network of fibrils entangled at the water-oil interface, which generates emulsions comprising large-sized droplets which are coming as a plurality of clusters made of suspended droplets. The resulting emulsions are not homogeneous.

SUMMARY OF THE INVENTION

It is an object of the present invention to provide new compositions of the oil-in-water emulsion type (advantageously of the Pickering emulsion family), comprising emulsifying particles capable of stabilizing the emulsion, advantageously without any surfactant and in an especially stable manner over the time.

The present invention thus relates to a composition in the form of an emulsion comprising a hydrophobic phase dispersed in an aqueous phase, which composition contains emulsifying particles consisting of cellulose nanocrystals having an elongated shape, more advantageously being needle-shaped, with a length ranging from 25 nm to 1 μm, and a width ranging from 5 to 30 nm.

The cellulose nanocrystals have been widely studied, especially in an attempt to characterize their morphology and their crystalline structure.

However, as far as the inventors knew, such cellulose nanocrystals have never been used as emulsifying agents/emulsifiers for stabilizing emulsions.

And yet, as will be demonstrated in the following examples, such a composition turns to be particularly stable over time, while being free of any surfactant. Moreover, such an emulsion does withstand thermal transformations, both of the freezing as well of the heating type.

Other advantageous features, which may be taken either in combination or independently from each other, are detailed hereunder:

the cellulose nanocrystals do satisfy the following features: a length ranging from 100 nm to 1 μm, and a width ranging from 5 to 20 nm;

the cellulose nanocrystals have a length to width ratio higher than 1 and lower than 100, and preferably ranging from 10 to 55;

the cellulose nanocrystals have a surface charge density of maxi. 0.5 e $nm^{-2}$, and preferably a surface charge density of maxi. 0.31 e $nm^{-2}$, e corresponding to an elementary charge; in a first embodiment, the cellulose nanocrystals have a charged surface, advantageously surface negative charges, with a surface charge density ranging from 0.01 e $nm^{-2}$ to 0.31 e $nm^{-2}$ in a second embodiment, the cellulose nanocrystals have a neutral surface, the surface charge density being lower than or equal to 0.01 e $nm^{-2}$;

the cellulose nanocrystals have hydrophobic groups on the surface thereof.

The present invention further relates to the use of cellulose nanocrystals such as defined hereabove, to stabilize an emulsion comprising a hydrophobic phase dispersed in an aqueous phase.

The present invention also relates to a method for preparing a composition in the form of an emulsion as defined hereabove, comprising the following steps of:

(a) providing cellulose nanocrystals such as defined hereabove, thereafter (b) incorporating said cellulose nanocrystals to the aqueous phase of said composition, so as to stabilize said emulsion.

The cellulose nanocrystals provided in step (a) are advantageously obtained through a production method from a cellulose, said production method being selected from the following methods: mechanical fractionation, adjusted chemical hydrolysis, and dissolution/recrystallisation.

In this case, the method for making cellulose nanocrystals is advantageously followed with a method of post-modification of said cellulose nanocrystals, at the end of which their surface charge density and/or their hydrophobicity will have changed.

For changing the charge density, the post-modification method does advantageously consist of a method for introducing or hydrolyzing surface charge-carrying groups, which groups are preferably chosen from sulfonate, carboxylate, phosphate, phosphonate and sulfate groups.

In a first preferred embodiment, the production method does consist of a sulfuric acid-mediated adjusted (partial) acid hydrolysis method for cellulose, to obtain cellulose nanocrystals provided with sulfate groups on their surface; and the optional post-modification method does consist of a controlled hydrolysis process for said sulfate groups.

In a second preferred embodiment, the production method does consist of a hydrochloric acid-mediated adjusted (partial) acid hydrolysis method for cellulose; and the optional post-modification method does consist of a post-sulfation process of said cellulose nanocrystals.

DETAILED DESCRIPTION OF THE PRESENT INVENTION

Composition of the Invention

As mentioned hereabove, the composition according to the invention does consist of a composition in the form of an emulsion comprising a hydrophobic phase dispersed in an aqueous phase, and comprising emulsifying particles consisting of cellulose nanocrystals.

As used herein, an "emulsion" is intended to mean a mixture, which is macroscopically homogeneous but microscopically heterogeneous, of two liquid and immiscible phases.

In the present case, the emulsion of the invention is of the "oil-in-water" type, that is to say (i) the dispersing phase is an aqueous phase and (ii) the dispersed phase is an organic phase (a hydrophobic or an oil phase). Such an emulsion is also commonly referred to as the "O/W" initials.

To ensure the stability thereof, the emulsion of the invention thus comprises cellulose nanocrystals.

The cellulose nanocrystals are known from the prior art, often under the name "cellulose whiskers" or "cellulose nanowiskers".

Such cellulose nanocrystals may be derived from various sources: plants (e.g. woodpulp, cotton or algae), animals (e.g. tunicate), bacteria, regenerated cellulose or mercerized cellulose. They are for example described in Samir and al. (2005, Biomacromolecules, Vol. 6: 612-626) or in Elazzouzi-Hafraoui and al. (Biomacromolecules. 2008; 9(1):57-65.).

More precisely, the cellulose nanocrystals are highly crystalline solid particles.

These cellulose nanocrystals are devoid of, or at least nearly devoid of, any amorphous fraction. They preferably have a degree of crystallinity of at least 60%, and preferably between 60% and 95% (see for example Elazzouzi-Hafraoui and al., 2008, supra).

For the composition according to the invention, the cellulose nanocrystals have an elongated shape, that is to say, advantageously, a length to width ratio higher than 1.

Still preferably, these cellulose nanocrystals have an acicular shape, that is to say a needle-like, linear and sharp-pointed shape.

This morphology may be observed for example through electron microscopy, in particular through transmission electron microscopy (or "TEM").

Still in the composition of the invention, these cellulose nanocrystals have following size features: (i) a length ranging from 25 nm to 1 μm, and (ii) a width ranging from 5 to 30 nm.

As used herein, a "length" is intended to mean the largest distance within the nanocrystals, between two points located at the ends of their respective longitudinal axis.

As used herein, a "width" is intended to mean the dimension as measured along the length of the nanocrystals, perpendicularly to their respective longitudinal axis and corresponding to their largest section.

In the preferred embodiments, the cellulose nanoparticles do form a quite homogeneous population of nanocrystals which experimental length values follow a Gaussian distribution centered on the length value that was allocated to said population of nanocrystals. In these preferred embodiments, cellulose nanocrystals of a "single determined size" could be used for example, as will be illustrated in the examples.

In practice, the morphology and the size of nanocrystals may be determined by implementing various imagery technologies such as transmission electron microscopy (TEM) or atomic force microscopy (AFM), Small-Angle X-ray Scattering and Neutron diffusion, (respectively SAXS and SANS) or dynamic light scattering (DLS).

In one preferred embodiment, the cellulose nanocrystals have the following size: (i) a length ranging from 100 nm to 1 μm, and (ii) a width ranging from 5 to 20 nm.

More advantageously, the cellulose nanocrystals have a length to width ratio higher than 1 and lower than 100, preferably ranging from 10 to 55.

A length to width ratio higher than 1 and lower than 100 includes length to width ratios of at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 and 99.

A length to width ratio ranging from 10 and 55 includes length to width ratios chosen from 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53 and 54.

For example, nanocrystals obtained from cotton cellulose do advantageously have a length ranging from 100 nm to 200 nm, for a width ranging from 12 to 15 nm. The length to width ratio does advantageously range from 7 to 17, and preferably from 10 to 13.

In a further example, the nanocrystals may be obtained from a bacterial cellulose. Such nanocrystals (known under the name "bacterial cellulose nanocrystals" or "BCN") do advantageously have a length ranging from 600 nm to 1 µm, for a width ranging from 12 to 17 nm. The length to width ratio does advantageously range from 35 to 83, preferably from 45 to 55.

To optimize the stability of Pickering emulsions, the cellulose nanocrystals are advantageously selected according to their surface features, while especially taking (i) their electrostatic and/or (ii) hydrophobic or hydrophilic properties into account.

As far as the surface electrostatic aspect, the cellulose nanocrystals which stabilize the emulsion have advantageously a surface charge density of maxi. 0.5 e $nm^{-2}$, and preferably a surface charge density of maxi. 0.31 e $nm^{-2}$. It should be noted that "e" stands for elementary charge.

The surface charge density and the ionic strength of the aqueous phase are advantageously adapted to each other.

Advantageously, such surface charge density is determined through conductometric assay; one particular embodiment is described hereafter in the section Examples.

More precisely and according to one embodiment, the cellulose nanocrystals comprise a charged surface, with a surface charge density ranging from 0.01 e $nm^{-2}$ to 0.31 e $nm^{-2}$.

As will be described in the examples, the desired density for the surface charges may be obtained by controlling the sulfation degree of the nanocrystals. The sulfation degree of the nanocrystals may be controlled by submitting the cellulose nanocrystals to a sulfation treatment and, if necessary, to a desulfation post-treatment.

The applicant has shown that a stable Pickering emulsion could be obtained when using cellulose nanocrystals that are almost uncharged.

The applicant has also shown that above 0.31 e $nm^{-2}$, the stability of the Pickering emulsion is very significantly altered.

The applicant has shown that cellulose nanocrystals with an excessively high charge density value suffer from a surface becoming too hydrophilic and are found in large amounts suspended in the aqueous phase instead of being located at the oil-water interface to stabilize the emulsion.

In this case, the cellulose nanocrystals do advantageously have surface negative charges, which are advantageously carried by anionic groups on the surface.

The anionic groups of the cellulose nanocrystals are selected for example from sulfonate groups, carboxylate groups, phosphate groups, phosphonate groups and sulfate groups.

Transposing a degree of substitution value (DS) to the corresponding surface charge density value (e.$mm^{-2}$) is direct, since the number of charges in the respective chemical group is known. As an illustration, for sulfate groups, which carry a single charge, the DS value (number of sulfate groups per unit of surface) is the same as the surface charge density value (same number of charges per unit of surface).

In other words, these cellulose nanocrystals have a degree of substitution (DS) ranging from $10^{-3}$ to $10^{-2}$ e/$nm^2$, or a degree of substitution on the surface (DSs) ranging from DS/0.19 to DS/0.4, depending on the morphology of the nanocrystals used.

In a further embodiment, the cellulose nanocrystals have a neutral surface. In that case, the surface charge density is advantageously lower than or equal to 0.01 e $nm^{-2}$.

In practice, the charge density of the cellulose nanocrystals is advantageously selected depending on the ionic strength of the aqueous phase of the composition.

The cellulose nanocrystals used according to the invention do advantageously consist of cellulose nanocrystals which have not been submitted to any hydrophobization treatment. This includes the cellulose nanocrystals which hydroxyl groups have not been functionalized by atoms or hydrophobic groups. Typically, this includes those nanocrystals which have not been submitted to any hydrophobization treatment through esterification of hydroxyl groups by some organic acids.

In advantageous embodiments, the cellulose nanocrystals which are used to obtain the Pickering emulsion are not submitted to any post-production chemical treatment, other than a desulfation or sulfation treatment. Notably, cellulose nanocrystals will be preferably used, which have not been functionalized or grafted with groups enabling their subsequent cross-linking, for example with groups such as methacrylate or dimethacrylate groups. Also, cellulose nanocrystals will be preferably used, which have not been functionalized or grafted with polymeric molecules, such as with polyethylene glycol, poly(hydroxyester) or polystyrene.

The applicant has further demonstrated that the stability of the Pickering emulsion may be improved by implementing an aqueous phase having a predetermined minimum ionic strength.

In fact, a maximum stability of the Pickering emulsion is obtained with an ionic strength value corresponding to a NaCl final concentration of 0.02 M in said emulsion.

Without wishing to be bound by any theory, the applicant considers that the ionic strength threshold value of the aqueous phase from which an optimum stability of the emulsion may be obtained is that at which the charges (counterions) that are present in the aqueous phase do neutralize the charges (ions) that are present on the nanocrystals.

As will be shown in the examples, the presence of counterions in excess does not significantly affect the stability properties of the emulsion. In the event of a counterion massive excess, which was not observed in the test conditions of the examples, an impairment of the emulsion stability may be predicted, as a result of the nanocrystal precipitation.

As an indication, according to one particular embodiment, with a composition having an ionic strength lower than the ionic force corresponding to 10 mM NaCl, the cellulose nanocrystals do advantageously present a surface charge density of maxi. 0.03 e $nm^{-2}$.

With a composition having an ionic force higher than the ionic strength corresponding to 10 mM NaCl, the surface charge density supported by the cellulose nanocrystals does not seem to be a relevant parameter anymore for efficiently stabilizing the emulsion.

An ionic force higher than the ionic force corresponding to 10 mM NaCl includes an ionic strength higher than 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 210, 220, 230, 240, 250, 260, 270, 275, 280, 290, 300, 310, 315, 320, 325, 330, 335, 340, 345, 350, 360, 370, 375, 380, 390, 400, 410, 420, 430, 440, 450, 460, 470, 480, 490 or higher than 500 mM NaCl. Preferably, the ionic strength is lower than an ionic farce strength corresponding to 3 M NaCl.

The results of the examples show that, in some embodiments of an emulsion according to the invention, the stability of said emulsions already achieves a maximum level with an ionic strength of 20 mM NaCl for the composition, the stability degree of the emulsion remaining virtually unchanged for all the ionic force strength values tested, that is to say at least up to an ionic strength value corresponding to an ionic farce strength of 0.5 M NaCl.

As an alternative or as a complement to, still to optimize the stabilization of emulsions, the cellulose nanocrystals comprise hydrophobic groups on the surface thereof.

The density of the hydrophobic groups on the surface may be an interesting parameter for taking account of the interfacial tension (nature of the aqueous phase and of the oil phase).

Such hydrophobic groups are advantageously selected from acetyl, alkyl, aryl, phenyl, benzyl, hydroxybutyl, hydroxypropyl, polycaprolactone (or PCL) groups.

The cellulose nanocrystals are classically incorporated to the aqueous phase of the composition.

According to a preferred embodiment, the Pickering emulsion composition is only stabilized by the cellulose nanocrystals, with no other emulsifying agent or stabilizer being added thereto.

According to a preferred embodiment, the Pickering emulsion composition does not comprise any functionalized or unfunctionalized solid particle, other than the cellulose nanocrystals.

As an alternative, the composition is stabilized by the cellulose nanocrystals, added on together with at least one other compound having emulsifying properties and/or stabilizing properties, for example with or without surfactant(s).

For example, the Pickering emulsion composition according to the invention may comprise CTAB (hexadecyl trimethylammonium bromide).

The composition advantageously comprises from 0.035% to 2% by weight, still preferably from 0.05% to 1% by weight, of cellulose nanocrystals relative to the total weight of said composition.

This weight proportion of cellulose nanocrystals may be evaluated for example via the solid content of the aqueous phase or by sugar determination after hydrolysis.

It is proven according to the invention that an amount of cellulose nanocrystals sufficient for obtaining a surface coverage of at least 60% is preferred for preparing a Pickering emulsion composition.

In particular, if the nanoparticles weight is insufficient as compared to the oil volume, a droplet coalescence of the hydrophobic phase may form and thus will tend to generate a minimum surface coverage of 60%.

As defined in the present description, the "surface coverage" by the cellulose nanocrystals represents the amount of surface of droplets of the hydrophobic phase that are dispersed in the aqueous phase, at the oil-water interface, which is covered by the cellulose nanocrystals.

The surface coverage "C", which corresponds to the ratio of (i) the surface of cellulose nanocrystals presents in the emulsion composition that may stabilize at the hydrophobic internal phase-hydrophilic continuous phase interface to (ii) the total surface of the hydrophobic phase droplets in said emulsion composition, is obtained via the following formula (I):

$$C = S_p/S_d \quad \text{(I), wherein:}$$

$S_p$ represents the surface of cellulose nanocrystals in the emulsion composition that may stabilize at the interface, and $S_d$ represents the total surface of the hydrophobic phase droplets in the emulsion composition.

The nanocrystal surface is assimilated to a single-plane surface, supposing that the nanocrystals are aligned on said surface to form a flat ribbon.

As a consequence, the surface value of the nanocrystals may be calculated according to the following formula (II):

$$S_p = N_p L l = \frac{m_p}{h \rho_p}, \quad \text{(II)}$$

with:

$$N_p = \frac{m_p}{V_p \times \rho_p} = \frac{m_p}{L \times l \times h \times \rho_p}$$

wherein:

$S_p$ represents the surface of the cellulose nanocrystals that may stabilize at the interface present in the emulsion composition, $N_p$ represents the number of cellulose nanocrystals present in the aqueous phase, L represents the length of the cellulose nanocrystals, l represents the width of the cellulose nanocrystals, h represents the height of the cellulose nanocrystals, $m_p$ represents the weight of the cellulose nanocrystals, and $\rho$ represents the density of the cellulose nanocrystals.

The surface of the droplets is the surface at the oil-water interface, which has been calculated for each droplet mean diameter according D(3,2).

As a consequence, the surface value of the droplets may be calculated according to the following formula (III):

$$S_d = 4\pi R^2 \times Ng = 4\pi R^2 \times \frac{3 V_{oil}}{4\pi R^3} = \frac{3 V_{oil}}{R}, \quad \text{(III)}$$

with:

$$N_g = \frac{V_{oil}}{4/3 \pi R^3} \quad \text{(IV)}$$

wherein:

Ng represents the number of droplets present in the emulsion, $S_d$ represents the surface value of the hydrophobic phase droplets, R represents the droplet mean radius, and $V_{oil}$ represents the total volume of the hydrophobic internal phase.

The final value of the surface coverage "C" is calculated according to the following formula (I) already mentioned hereabove:

$$C = Sp/Sd \quad \text{(I), wherein:}$$

$S_p$ represents the surface of the cellulose nanocrystals that may stabilize at the interface which are present in the emulsion composition, $S_d$ represents the total surface of the hydrophobic phase droplets in the emulsion corn position.

In the Pickering emulsion composition, the hydrophobic dispersed phase represents advantageously less than 50% by volume relative to the total volume of the composition.

The hydrophobic phase represents advantageously from 5% to 45% by volume relative to the total weight of the composition.

As described hereunder, the hydrophobic phase is selected from vegetable oils, animal oils, mineral oils, synthetic oils, hydrophobic organic solvents and hydrophobic liquid polymers.

The Pickering emulsion composition according to the invention may further comprise any other compound that may be suitable for the intended end-use.

This Pickering emulsion composition may thus be adapted to the selected application advantageously from food compositions, cosmetic compositions, pharmaceutical compositions and phytosanitary compositions.

As is known, the composition may comprise, depending on the expected application, for example, without any limitation, active ingredients and additives such as preservatives, gelling agents, solvents, dyes, and so on.

The Hydrophobic Phase

The hydrophobic phase is selected from vegetable oils, animal oils, mineral oils, synthetic oils, hydrophobic organic solvents and hydrophobic liquid polymers.

The hydrophobic phase may be selected from alkanes or cycloalkanes, whether substituted or not.

For the hydrophobic phase, an alkane having more than 5 carbon atoms includes alkanes having more than 6, 7, 8, 9, 10, 11, 12, 13, 14, 15, 16 or more than 17 carbon atoms, that is to say notably, according to the known nomenclature, $C_6$-$C_{18}$ alkanes with formula $C_n H_{2n+2}$. Said alkanes may be linear or branched.

Said alkanes include linear, cyclic or branched alkanes, of the hexane, heptane, octane, nonane, decane, undecane, dodecane, tridecane, tetradecane, pentadecane, hexadecane, heptadecane and octadecane type.

Substituted alkanes include the hereabove linear or branched alkanes, at least one hydrogen atom of which is substituted by a halogen selected from chlorine, bromine, iodine or fluorine. The substitution of at least one hydrogen atom includes the substitution of 2, 3, 4 or 5 hydrogen atoms.

In some embodiments, said cycloalkane is a substituted or non substituted cyclohexane. The cyclohexane may be substituted by 1, 2, 3 or 4 halogen atoms selected from chlorine, bromine, iodine or fluorine.

The hydrophobic phase may further comprise a mixture of such alkanes, for example in the form of a paraffin oil.

In some embodiments, the hydrophobic phase comprises one or more hydrophobic polymerizable monomers, of a known type.

In other embodiments, the hydrophobic phase substantially consists of a composition of a hydrophobic monomer or a mixture of hydrophobic monomers. As an illustration, the hydrophobic phase may substantially consist of a composition of styrene monomers.

The Hydrophilic Phase

As used herein, a "hydrophilic phase" or "aqueous phase" is intended to mean a liquid that is immiscible with the hydrophobic phase. A water-miscible hydrophilic phase will be preferably used. The hydrophilic phase may be water, as will be illustrated in the examples.

The hydrophilic phase may be a hydrophilic solvent, preferably a hydroxyl group-carrying solvent, such as glycols. For the hydrophilic phase, the glycols include glycerol and polyethylene glycols.

The hydrophilic phase may also comprise water-soluble texturizing agents, especially thickening agents or viscosifiers, such as polysaccharides (for example dextran or xanthan, the latter being broadly used in food applications).

The hydrophilic phase may be made, for all or part thereof, of an organic liquid selected from an alcohol such as ethanol, or acetone.

The hydrophilic phase may comprise one single liquid or be a mixture of several liquids.

Method for Preparing the Composition of the Invention

The method for preparing the composition according to the invention, advantageously comprises the following steps of:

(a) providing cellulose nanocrystals such as defined hereabove, thereafter (b) incorporating said cellulose nanocrystals to the aqueous phase of said composition, so as to stabilize said emulsion.

The general steps for preparing the emulsion may be conducted according to classical procedures, especially used pour the production of Pickering emulsions.

A production method may be used for preparing the emulsion, based on ultrasounds for example.

In particular, the step of incorporating the cellulose nanocrystals to the aqueous phase does correspond to the steps implemented for incorporating colloidal particles when preparing Pickering emulsions.

The cellulose nanocrystals provided in step (a) are advantageously obtained through a production method based on cellulose.

The cellulose is advantageously selected amongst at least one from the various following origins thereof: plants, animals, bacteria, algae or from those regenerated from a transformed cellulose available on the market.

The main source of cellulose comes from plant fibers. The cellulose does exist within plants as a component of the cell wall, in the form of bundles of micro-fibrils.

Part of these micro-fibrils is made of a so called "amorphous" cellulose, while a second part is made of a so called "crystalline cellulose".

The cellulose nanocrystals are advantageously derived from a crystalline cellulose isolated from plant fibers, through removal of the cellulose amorphous fraction.

To be mentioned as suitable vegetable sources are for example cotton, birch, hemp, ramie, flax, spruce.

To be mentioned as suitable algae sources are for example *Valonia* or *Chladophora*.

To be mentioned as suitable bacteria sources are for example *Gluconoacetobacter xylinus* which produces Nata de coco through direct incubation in coconut milk.

To be mentioned as suitable animal sources of cellulose are for example the tunicate.

The cellulose may also be regenerated from a transformed cellulose available on the market, especially in the form of paper.

To be mentioned as a suitable example for preparing cellulose cotton is Whatman filter paper (trademark).

Cellulose may also consist of a so called "mercerized cellulose" (mercerization does consist of a traditional treatment of cellulose based on sodium hydroxide).

Starting from this cellulosic raw material, the production method of nanocrystals is advantageously selected from the following methods: mechanical fractionation, adjusted chemical hydrolysis, and dissolution/recrystallisation.

As used herein, a "mechanical fractionation" is intended to mean a traditional homogenization process under high pressure.

As used herein, an "adjusted chemical hydrolysis" is intended to mean a treatment of cellulose through an acidic chemical compound, under conditions ensuring the removal of the amorphous fraction thereof.

The acidic chemical compound is advantageously selected from sulfuric acid or hydrochloric acid.

As described in the following examples, the surface charge can be modulated depending on the acid type, temperature and hydrolysis duration.

Thus, a hydrochloric acid-mediated hydrolysis would result in an almost neutral surface condition, while a sulfuric acid-mediated hydrolysis would introduce sulfate charges ($SO_3^-$ groups) on the cellulose nanocrystal surface.

Such treatments of the "adjusted chemical hydrolysis" type are for example described in Elazzouzi-Hafraoui and al. (2008), supra, or in Eichhorn S. J. and al ("Review: current international research into cellulose nanofibers and nanocomposites". J Mater Sci 2010. 45, 1-33).

As used herein, a "dissolution/recrystallisation" is intended to mean a solvent-mediated treatment, for example using phosphoric acid, urea/NaOH, ionic liquids, and so on, followed with recrystallisation. Such a method is described for example in Helbert and al. (Cellulose. 1998, 5, 113-122).

Before being integrated to the composition, the cellulose nanocrystals obtained are advantageously submitted to a post-modification method, at the end of which their surface charge density and/or their hydrophobicity/hydrophylicity have been modified.

This post-modification aims at optimizing the surface features of the cellulose nanocrystals, especially depending on the emulsion to which they are introduced, so as to optimize the stabilization thereof.

To change the surface charge density, the post-modification method does advantageously consist of a method for introducing or hydrolyzing groups on the surface, carrying said surface charges.

In this case, the post-modification process comprises a step of introducing or hydrolyzing surface groups chosen from sulfonate, carboxylate, phosphate, phosphonate and sulfate groups.

As an indication, for introducing respective surface groups, a method may be implemented as described in Habibi Y and al. "TEMPO-mediated surface oxidation of cellulose whiskers", Cellulose, 2006, 13(6), 679-687.

As a further indication, and conversely, for hydrolyzing such surface groups, either an acid treatment may be carried out as described hereafter in the part Examples or a mechanical treatment of the sonication type.

In this context and in a first embodiment, the production method does consist of a sulfuric acid-mediated adjusted acid hydrolysis method for cellulose, to obtain cellulose nanocrystals provided with sulfate groups on their surface.

And the post-modification method does consist of a controlled hydrolysis for said sulfate groups, that is to say for example through an acid treatment (chosen for example from hydrochloric acid or trifluoroacetic acid) for a time period corresponding to the expected degree of hydrolysis.

In a second embodiment, the production method does consist of a hydrochloric acid-mediated adjusted acid hydrolysis method for cellulose.

And the optional post-modification method does consist of a post-sulfation process of said cellulose nanocrystals. Such a post-sulfation is advantageously carried out by means of an acid treatment of the nanocrystals through sulfuric acid.

To change the hydrophobicity, the post-modification method does advantageously consist of a method for introducing or hydrolyzing groups of hydrophobic nature.

Amongst the hydrophobic groups that may be either introduced or removed, alkyl, aryl, phenyl, benzyl, acetyl, hydroxybutyl, hydroxypropyl, polycaprolactone (or PCL) groups may be especially mentioned.

As an indication, for introducing and/or hydrolyzing respective surface groups, it may be referred to the following documents: H Lonnberg and al., "Surface grafting of microfibrillated cellulose with poly(epsilon-caprolactone)—Synthesis and characterization", 2008 European polymer Journal 44, 2991-2997, or R. Debashish and al., "Cellulose modification by polymer grafting: a review" Chemical Society Reviews 2009 38 (7) 1825-2148.

The present invention will be hereafter further illustrated, without any limitation, by means of the following examples.

FIGURE

FIG. 1 shows the influence of the ionic strength of the emulsion composition, on the stability thereof. In abscissa are the ionic strength values, expressed as the NaCl final molar concentration in the aqueous phase. In ordinates, the volume fraction of emulsion, expressed as volume percentage.

EXAMPLE

Preparation of an Oil-in-Water Pickering Emulsion, Stabilized by Cellulose Nanocrystals A. Procedures
Procedure 1: Preparation of Bacterial Cellulose Nanocrystals The method for obtaining bacterial cellulose nanocrystals is described for example in N R Gilkes and al., J of Biological chemistry 1992, 267 (10), 6743-6749.

BCN fragments are nanofibrillated in a Waring mixer, at high speed, in an aqueous suspension comprising ice cubes so as to combine shearing stress and impact.

The thus obtained pulp is drained through polyamide filters, thereafter suspended in a sodium hydroxide solution 0.5 N under stirring in a closed flask for two hours at 70° C.

After removal of the alkaline elements through repeated rinsing procedures with water pH 8, a bleaching step is carried out using chlorite so as to obtain a compound of the hollocellulose type, as described in Gilkes and al. (Gilkes, N. R.; Jervis, E.; Henrissat, B.; Tekant, B.; Miller, R. C.; Warren, R. A. J.; Kilburn, D. G., The adsorption of a bacterial cellulase and its 2 isolated domains to crystalline cellulose. J. Biol. Chem. 1992, 267 (10), 6743-6749).

Typically, a solution of $NaClO_2$, 17 g/L, is combined with the same volume of acetate buffer pH 4.5 (27 g NaOH+75 g acetic acid per liter).

The bleached bacterial cellulose is then suspended and heated under stirring at 70° C., for two hours under reflux.

These steps of alkaline treatment and bleaching are repeated at least once, so as to obtain a bleached pulp.

This bacterial cellulose is then hydrolyzed using a hydrochloric acid solution (2.5 N, two hours under reflux).

Acidic compounds are removed through repeated procedures until neutrality: centrifugation (10000 g for 5 minutes) and dispersion in a purified solution 18 Mohm.

The thus obtained cellulose nanocrystals are stored at 4° C. in the form of a suspension 1%, with the addition of a droplet $CHCl_3$ for 250 mL of suspension.

Procedure 2: Preparation of Post-Sulfated Bacterial Cellulose Nanocrystals

An aqueous suspension of bacterial cellulose nanocrystals 1.34%, obtained according to procedure 1, is combined with a solution of $H_2SO_4$ 2.2 M (i.e. 3/2 v/v ratio) under vigorous stirring at room temperature.

The nanocrystals are then centrifuged (10000 g/5 min).

The resulting product is combined with glass beads (3 mm diameter), thereafter centrifuged again (10000 g/10 min).

The glass beads coated with sulfated nanocrystals are stored in a dry place for two hours at 40° C.

The beads are then dried in a dessicator, in the presence of $P_2O_5$ at 50° C. for 14 hours.

The cellulose sulfated nanocrystals are recovered by washing the beads with distilled water, and successive centrifugation from 10000 rpm up to 76000 rpm for 10 to 30 minutes, to obtain a colloidal suspension.

Finally, the collected product is dialyzed until neutrality, and residual electrolytes are removed on an ion exchange resin (mixed bed resin TMD-8, hydrogen and hydroxide form).

Procedure 3: Desulfation of Post-Sulfated Bacterial Cellulose Nanocrystals

The suspension of bacterial cellulose nanocrystals 2.2%, post-sulfated according to procedure 2, is heated for three hours at 100° C. in HCl 2.5 N, thereafter washed by centrifugation at 6000 rpm for 5 minutes 6 times.

The collected product is then dialyzed until neutrality, and residual electrolytes are removed on an ion exchange resin (mixed bed resin TMD-8).

Procedure 4: Preparation of Cellulose Sulfated Nanocrystals Derived from Cotton

The method for obtaining cotton cellulose nanocrystals is described for example in the document of Elazzouzi-Hafraoui and al. (2008).

25 g of paper is humidified in 700 mL deionized water, thereafter the solution is combined until a homogeneous mixture is obtained. The excess of water is then removed through filtration.

The resulting product is suspended in 500 mL of a 61% sulfuric acid solution, maintained at 72° C. under stirring for 30 minutes.

The suspension is then cooled, washed with ultrapure water through successive centrifugation procedures at 8000 rpm for 15 minutes, and dialyzed until neutrality during three days with a reception phase made of distilled water.

Residual electrolytes are then removed using a mixed bed resin (TMD-8, hydrogen and hydroxyl form) during 4 days.

The final dispersion, made of sulfated cotton, is stored at 4° C.

Procedure 5: Desulfation Sulfated Cotton Nanocrystals

Desulfation of sulfated cotton nanocrystals according to procedure 4 is carried out by means of an acid treatment, using 5 mL of a HCl solution 5N or trifluoroacetic acid solution 10 N (TFA), added to 5 mL of a suspension of sulfated cotton nanocrystals concentrated to 13 g/L.

Such acid treatment is carried out in a closed vessel and heated to a temperature ranging from 98 to 100° C. under stirring, for 1, 2, 5 or 10 hours.

As an alternative, 5 mL of a TFA solution 10M is added to 5 mL of cotton nanocrystals, with a 10-hour incubation at 80° C. under stirring.

The two resulting products were rinsed with water by centrifugation (6 times, 6000 rpm for 5-7 minutes).

Procedure 6: Measuring the Sulfation Degree through Conductometric Titration

Using conductometric titration is a way to determine the sulfation degree of cellulose nanocrystals.

Such a method is described for example in Goussé and al., 2002, Polymer 43, 2645-2651.

50 mL of an aqueous suspension of cellulose nanocrystals (0.1% weight/volume) are maintained under stirring with degassing for 10 minutes, before titration with a NaOH solution 0.01 M.

The amount of grafted sulfate is calculated by taking into consideration that only one hydroxyl group OH may be substituted for each glucose unit, thus leading to a degree of sulfate substitution (DS) given by the following equations:

$$DS = (V_{eq} \times C_{NaOH} \times M_w)/m$$

$$M_w = 162/(1 - 80 \times V_{eq} \times C_{NaOH}/m)$$

wherein $V_{eq}$ represents the amount in ml of NaOH up to achieving the equivalence point, $C_{NaOH}$ is the concentration of NaOH expressed in mol/L, $M_w$ is the mean molecular weight of a glucose unit, m is the weight of titrated cellulose, 80 is intended to mean the difference between the molecular weight of a sulfated glucose unit and the molecular weight of a non-sulfated glucose unit.

The value that results from these equations must be corrected by the glucosidic unit surface fraction (GSF), to obtain the degree of substitution on the surface (DSs).

According to the structure of the cellulose chains, only primary OH groups (C6) may be esterified, and only 50% of these OH groups are accessible on the surface because of the alternating conformation. The maximal DS is thus 0.5.

Since the samples do present various morphologies and for being globally applicable to all different cellulose particles, a general equation was defined so as to determine the value de glucose surface fraction (GSF) by taking the cross-section ratio (k) into consideration, whatever the length of the particles.

Thus, for a given width (W×l) and appearance ratio (k):

$$GSF(k) = ((2*((k*0.596)+0.532))/W \times l) - 4*((k*0.532*0.596)/W \times l^2)$$

Procedure 7: Transmission Electron Microscopy (TEM)

20 µL of an aqueous suspension of cellulose nanocrystals (0.1% weight/volume) are deposited onto a carbon-coated grid for electron microscopy; the excess of solvent absorbed, the sample is marked by adding uranyl acetate thereto (2% in water).

This grid for electron microscopy is dried in an oven at 40° C.

The grids were then examined with an transmission electron microscope JEOL (80 kV).

Procedure 8: Preparation of an O/W Emulsion Stabilized by Nanocrystals

A first Pickering oil-in-water emulsion is prepared by implementing an aqueous phase with a known cellulose nanocrystals concentration.

Additional emulsions are prepared, based upon a 30:70 oil-water ratio, starting from an aqueous phase comprising nanoparticles at a concentration of 0.5% by weight, relative to the weight of the emulsion (without additional dilution).

In an Eppendorf tube, 0.3 mL hexadecane are added to 0.7 mL of the aqueous suspension; for 30 seconds, the mixture is submitted to a treatment alternating 2 seconds ultrasound-based treatment and 5 seconds rest.

Procedure 9: Test of Stability, Optical Microscopy

Emulsions obtained according to procedure 8 are centrifuged for 30 seconds at 10000 g. As a result of the difference density of hexadecane to water, a creaming is observed. The emulsion volume is evaluated before and after centrifugation.

Around 15 µL of the Pickering solution is incorporated to 1 mL distilled water. The product is mixed using a vortex, thereafter a droplet is deposited onto a blade to observe with the microscope.

The diameter of droplets is measured from the pictures obtained, by analyzing the collected pictures using an "Image J" software.

In addition, these results were compared to the distribution of the droplet sizes determined through a Malvern Master-Sizer apparatus using a light diffraction device and the Fraunhofer diffraction equation. The clustering risk will be limited in the present case by adding SDS (Sodium Dodecyl Sulfate) just before conducting the measurement.

Procedure 10: Scanning Electron Microscopy SEM

In order to prepare the emulsion sample to be observed through scanning electron microscopy (SEM), 280-380 mg of a styrene/initiator mixture (st: V-65 120:1 ratio weight/weight) are combined with from 1.0 to 1.5 mL of a 0.5% solution of a water sample solution, submitted to ultrasounds for 1-2 min and degassed with nitrogen for 10 minutes.

The emulsion was obtained by ultrasounds for 30 seconds (3 second-pulses, 5-second intervals).

Thereafter, 500 µL of water are added to the system, submitted then to a vortex.

This system is degassed with nitrogen for 10 minutes, and the polymerization occurred at 63° C. without stirring for 24 h.

The resulting preparation is submitted to a metallization step according to the traditional scanning electron microscopy techniques, before observation.

For being observed by scanning electron microscopy, the emulsion sample may be further prepared with another initiator, i.e. AIBN (azo-bisisobutyronitrile), according to the following procedure:

degassing and stirring 17.5 mL of a 3 g/L 50 mM nanocrystal suspension, for 10 min under nitrogen,
addition of 7.5 mL styrene and 69.8 mg AIBN,
ultrasonic emulsification for 1 min,
degassing for 10 min, and
polymerization under stirring at 70° C., for 1 h to 24 h.

The resulting preparation is submitted to a metallization step according to the traditional scanning electron microscopy techniques, before observation.

Procedure 11: Acetylation of Bacterial Cellulose Nanocrystals 5 mL of a suspension containing bacterial cellulose nanocrystals 1.34% are combined with 40 mL of a 100% acetic acid solution.

Water is gradually replaced with acetic acid through distillation on a rotary evaporator (the water bath temperature is lower than 40° C.), thereafter centrifuged for five times (5 minutes at 10000 g).

40 mL of the acetic acid sample are divided into two parts.

The two parts are combined and heated at 40° C. for 5 minutes and for 1 minute with 6 µL of a 5% catalyst.

Thereafter, 2.5 mL of a mixture composed of acetic anhydride 98% and acetic acid 100% (1:1 ratio, volume/volume) are added thereto.

The sample solution is observed under polarized light so as to detect any presence of liquid crystals.

The reaction is quenched by adding water (1:1 ratio, v/v), either after one minute for one part (B1), or after three minutes for the other part (B2).

A final ultracentrifugation (10000 g for 10-30 minutes) of all the solutions obtained enables to collect and to rinse the product.

The resulting product is combined with a mixed bed resin for three hours, then filtered.

Procedure 12: Acetylation of Cotton Cellulose Nanocrystals 10 mL of a suspension of 2.4% by weight of cotton desulfated nanoparticles (see procedure 5-nanoparticles were desulfated with HCl 2.5 N for 3 h) are combined with 90 mL acetic acid 100%.

Water is gradually replaced with acetic acid by distillation on a rotary evaporator (the water bath temperature was lower than 40° C.), thereafter a centrifugation is conducted 5 times for 7 min at 10000 g.

80 mL of the sample volume in acetic acid are divided into 2 fractions.

First Method

Both fractions were heated to 60° C. with 190 µL of a catalyst, that is to say a sulfuric acid solution of 5% by weight in acetic acid, and stirred.

After 5 minutes, 5 mL of a mixture made of 98% acetic anhydride and 100% acetic acid, in a 1:1 ratio, v/v, are added; and the sample solution was placed under polarized light-mediated observation to monitor the behavior of the liquid crystals in the sample.

When the transformation to liquid crystals is observed, the reaction is quenched by cooling on an ice bath; in addition, 10 mL 80% acetic acid are poured in the fat flask then water, i.e. half the volume of the sample solution.

The reaction is quenched after 1.5 min for the first fraction, and after 0.5 min for the second one.

Finally, an ultracentrifugation (65000 rpm for 15-30 min) of the solution of the second sample obtained is conducted so as to recover and to rinse the products; residual electrolytes are removed on an ion exchange resin for 3 h prior to filtrating.

Second Method

Part of the sample (c-wh 3) is heated at 40° C. under stirring, for 5 minutes, thereafter after 1 min with 190 µL of a 5% catalyst (see hereabove).

Thereafter 5 mL of a mixture made of 98% acetic anhydride and 100% acetic acid (1:1 ratio, v/v) are added, and the solution sample is observed under polarized light to control the behavior of the liquid crystals in the sample.

The reaction is quenched after 1 min by adding water according to a 1:1 ratio v/v.

The other part (c-wh 4) is heated at 40° C. under stirring for 5 minutes, thereafter 5 mL of a mixture made of 98% acetic anhydride and 100% acetic acid according to a 1:1 ratio v/v are added thereto.

Then 6 µL of a 5% catalyst (see hereabove) are added to the mixture; the reaction is quenched within 1 min by adding water according to a 1:1 ratio v/v.

Finally, all the solutions are submitted to an ultracentrifugation process (65000 rpm for 15-30 min) so as to recover and to rinse the products; residual electrolytes are removed on an ion exchange resin for 3 h prior to filtrating.

Acetylation by 98% acetic anhydride 10 mL of a solution of 2.4% by weight of desulfated cotton whiskers (c-wh is desulfated with HCl 2.5 N for 3 h) are combined with 90 mL 100% acetic acid; water is removed on a rotary evaporator (the water bath temperature obtained is lower than 40° C.).

a) 4 mL of 98% acetic anhydride are added to 40 mL of the solution obtained after 1 min under stirring, thereafter around 90 mL of water are added thereto (1AA-d-c-WH).

b) 12 mL of 98% acetic anhydride are added to 40 mL of the solution obtained after 15 min under stirring, thereafter around 80 mL of water are added thereto (3AA-d-c-WH).

Both samples are washed with water by centrifugation, and stored with a resin bed for 3 h, thereafter submitted to filtration.

Step by step acetylation with 98% acetic anhydride 5 mL of a solution of 2.4% by weight of desulfated cotton whiskers (c-wh is desulfated with HCl 2.5 N for 3 h) are combined with 0.5 mL 98% acetic anhydride, the reaction being maintained for 10 min under stirring; the same procedure is repeated 9 times.

The mixture is then divided into two fractions.

a) a fraction is washed with water by centrifugation and stored with a resin bed for 3 h, thereafter submitted to filtration (fraction STW1), b) the other fraction is stored in the presence of anhydride acid at 4° C. overnight, rinsed with water by centrifugation and stored with a resin bed for 3 h, thereafter submitted to filtration (fraction STW2).

Procedure 13: Grafting on the Surface of Poly-e-Caprolactone

The grafting on the surface of poly-e-caprolactone is effected on BCN and cotton whiskers.

50 mg of dried whiskers are combined with 860 mg of e-caprolactone for 48 h.

800 mg of poly-e-caprolactone are then added, and the dispersion is submitted to a treatment 5×10 sec.

1.5 µL of benzyl alcohol are added as a co-initiator, thereafter degassed with nitrogen for 30 min.

The solution is heated to 95° C.; 27 µL $Sn(Oct)_2$ are added thereto under nitrogen atmosphere.

The polymerization is continued for 18 h, prior to redispersing the product in 2 mL THF, filtrating and rinsing with methanol.

B. Result

Result 1: Stabilization of an Emulsion by Means of Bacterial Cellulose Nanoparticles The bacterial cellulose nanocrystals are obtained according to procedure 1, and do consist of neutral particles.

As will be shown hereunder, these nanocrystals have outstanding properties to form particularly stable Pickering emulsions.

Such emulsions were prepared according to procedure 8, with different hexadecane/aqueous phase ratios, that is to say starting from a 10:90 ratio up to a 50:50 ratio.

Thus, the particle concentration in the emulsions does vary depending on the volume fraction of water in said emulsions.

The optical microscopy analysis according to procedure 9 gives the results detailed in following table 1 hereunder.

TABLE 1

| Sample (hexadecane-water ratio) | number of droplets | Average area $\mu m^2$ | Mean Dn $\mu m$ | Mean Dw $\mu m$ | polydispersity | % of clusters |
|---|---|---|---|---|---|---|
| 10-90 | 250 | 6.4 | 3.0 | 3.4 | 1.15 | 95.0 |
| 20-80 | 250 | 7.9 | 3.3 | 3.7 | 1.12 | 92.2 |
| 30-70 | 855 | 13.9 | 4.3 | 4.8 | 1.12 | 71.3 |
| 40-60 | 252 | 18.1 | 4.9 | 5.5 | 1.12 | 65.4 |
| 50-50 | 259 | 24.0 | 5.6 | 6.4 | 1.14 | 35.8 |

The measures of the number of droplets, average area, mean diameter in number (mean Dn), mean diameter in weight (mean Dw), polydispersity (mean Dw/mean Dn) and of cluster percentages, have been effected as described by Putaux and al. (1999, International Journal of Biological Macromolecules, Vol. 26 (2-3): 145-150) and by Barakat and al. (2007, Biomacromolecules, Vol. 8 (4): 1236-1245).

For these various ratios, approximately the same mean diameter is measured by picture analysis, that is to say 4±2 µm with a polydispersity of 1.13±0.2.

The main difference lies in the clustering rate which decreases together with the reduction in the number of particles per mL of the hydrophobic phase.

According to these results and in order to limit the clustering phenomena, a 30:70 ratio is chosen for the following experiments.

The stability of the samples stored under various conditions (weather, temperature) is evaluated according to procedure 9.

No variation in the droplet size could be observed, even after a one month-storage of the samples at 4° C. or 40° C., or for up to 3 hours at 80° C.

Result 2: Characterization of the Cellulose Nanocrystals

The bacterial cellulose nanocrystals obtained according to procedures 1 to 5, are characterized by transmission electron microscopy in accordance with procedure 7. The surface features of the nanocrystals and the features of the emulsion are determined according to procedures 6 and 9.

The results obtained are summarized in following table 2.

TABLE 2

| Sample | Length/thickness in nm | DS (sulfate/sugar) | Charge density (sulfate/$nm^2$) | Nber of charges per nanocrystals | Droplet size (µm) Nber diameter or image J |
|---|---|---|---|---|---|
| BCN | 919/17 | $1.96 * 10^{-4}$ | $9.68 * 10^{-4}$ | 42.9 | 4.3 |
| s-BCN | 644/17 | $2.41 * 10^{-3}$ | $1.19 * 10^{-2}$ | 370.7 | 6.8 |
| d-s-BCN | 624/12 | $5.92 * 10^{-4}$ | $2.92 * 10^{-3}$ | 69.8 | 3.4 |
| Cotton t0 | 189/13 | $7.92 \cdot 10^{-3}$ | 0.123 | 952 | 11.0 |
| Cotton t1h HCl | 157/13 | $2.23 \cdot 10^{-3}$ | 0.035 | 224 | 6.7 |
| Cotton t2h | 147/13 | $1.21 \cdot 10^{-3}$ | 0.019 | 114 | 3.2 |
| Cotton t5h | 141/13 | $1.24 \cdot 10^{-3}$ | 0.019 | 123 | 3.7 |
| Cotton t10h | 117/13 | $1.32 \cdot 10^{-3}$ | 0.020 | 100 | 5.9 |
| Cotton t10h TFA | 128/13 | $1.08 \cdot 10^{-3}$ | 0.017 | 89 | 5.3 |

It should be noted for Table 2 that the charge density may be indifferently expressed in e nm$^{-2}$ or in sulfate/nm$^2$, due to the fact that the sulfate ion carries a single charge.

The electron microscopy analyses show that the particles all have an elongated shape.

For all the cellulose nanocrystals, the sulfuric acid-mediated hydrolysis tends to shorten the length. For example, the BCN is decreased from 919 nm to 644 nm, without any notable variation of the width after the sulfation step.

By contrast, the hydrochloric acid-mediated hydrolysis tends to peel the surface cellulose nanocrystals and thus to reduce or even to remove the sulfate groups, and thus to reduce or to remove the corresponding charges.

The corresponding emulsion is highly stable (at least one year long), and does withstand heating and freezing temperatures (2 hours at 80° C.).

Result 3: Influence of the Ionic Strength onto the Emulsion Stability

Emulsions were prepared, from cotton cellulose nanocrystals as described in Procedure 8.

For preparing the emulsions, an aqueous medium was used having increasing values of ionic strength.

More precisely, liquid aqueous media were used, having increasing values of NaCl final concentration, as indicated in following Table 3 hereunder.

TABLE 3

| NaCl (M) | Thickness (mm) | Volume % | Zeta pot (mV) |
|---|---|---|---|
| 0 | 0 | 0 | −55 |
| 0.02 | 9.2 | 42.6 | −35 |
| 0.05 | 9.6 | 44.4 | −25 |
| 0.08 | 9.5 | 44.0 | −10 |
| 0.1 | 9 | 41.9 | ~0 |
| 0.2 | 9.08 | 42.0 | ND* |
| 0.5 | 7.97 | 36.9 | ND |

*ND: Non Determined

The results are simultaneously presented in Table 3 and on FIG. 1.

The results given in Table 3 show the thickness evolution of the emulsion obtained after creaming (centrifugation); those are a relative value in mm, an emulsified volume percentage and zeta potential values which illustrate the screening level of the surface charges resulting from the added NaCl.

The results given on FIG. 1 illustrate even more clearly how stability is obtained in the emulsions of the present invention, as soon as the ionic farce strength value brought by a NaCl final concentration of 20 mM is reached.

What is claimed is:

1. A composition in the form of an emulsion comprising a hydrophobic phase dispersed in an aqueous phase, which composition contains emulsifying particles capable of stabilizing said emulsion, wherein said particles comprise cellulose nanocrystals having an elongated shape with a length ranging from 25 nm to 1 μm, and a width ranging from 5 to 30 nm, wherein the composition is a Pickering emulsion which is devoid of surfactants and wherein when the ionic strength of the composition is less than 10 mM, the cellulose nanocrystals have a surface charge density of 0.03 e nm$^{-2}$ or less, where e stands for the elementary electric charge.

2. A composition according to claim 1, wherein the cellulose nanocrystals have a length ranging from 100 nm to 1 μm, and a width ranging from 5 to 20 nm.

3. A composition according to claim 1, wherein the cellulose nanocrystals have a length to width ratio higher than 1 and lower than 100.

4. A composition according to claim 1, the cellulose nanocrystals have a surface charge density of at most 0.5 e nm$^{-2}$.

5. A composition according to claim 4, wherein the cellulose nanocrystals comprise a charged surface, with a surface charge density ranging from 0.01 e nm$^{-2}$ to 0.31 e nm$^{-2}$.

6. A composition according to claim 5, wherein the cellulose nanocrystals comprise surface negative charges.

7. A composition according to claim 6, wherein the cellulose nanocrystals have surface charge-carrying anionic groups on the surface thereof.

8. A composition according to claim 7, wherein the anionic groups of the cellulose nanocrystals are chosen from the group selected from sulfonate, carboxylate, phosphate, phosphonate and sulfate groups.

9. A composition according to claim 4, wherein the cellulose nanocrystals have a neutral surface, the surface charge density being lower than or equal to 0.01 e nm$^{-2}$.

10. A composition according to claim 1, wherein the cellulose nanocrystals have hydrophobic groups on the surface thereof.

11. A composition according to claim 10, wherein the hydrophobic groups of the cellulose nanocrystals are acetyl groups.

12. A composition according to claim 1, wherein said composition comprises from 0.035% to 2% by weight of cellulose nanocrystals relative to the total weight of said composition.

13. A composition according to claim 1, wherein the hydrophobic phase represents from 5% to 45% by weight relative to the total weight of said composition.

14. A composition according to claim 1, wherein the hydrophobic phase is selected from vegetable oils, animal oils, mineral oils, synthetic oils, hydrophobic organic solvents and hydrophobic liquid polymers.

15. A composition according to claim 1, wherein the composition is selected from the group consisting of food compositions, cosmetic compositions, pharmaceutical compositions and phytosanitary compositions.

16. A composition consisting of:
   an aqueous phase;
   a hydrophobic phase dispersed in an aqueous phase; and
   emulsifying particles capable of stabilizing an emulsion, said particles comprising cellulose nanocrystals having an elongated shape with a length ranging from 25 nm to 1 μm, and a width ranging from 5 to 30 nm;
   wherein the composition is a stable emulsion, and wherein when the ionic strength of the composition is less than 10 mM, the cellulose nanocrystals have a surface charge density of 0.03 e nm$^{-2}$ or less, where e stands for the elementary electric charge.

17. The composition of claim 16 which is a Pickering emulsion devoid of surfactants.

18. The composition of claim 1 wherein the ionic strength of the composition is 20 mM.

19. The composition of claim 1 wherein the ionic strength of the composition is 0.5 M or less.

20. The composition of claim 1 wherein the cellulose nanocrystals have surface charge density less than 0.31 e nm$^{-2}$.

* * * * *